US007457449B2

(12) United States Patent
Sakurai et al.

(10) Patent No.: US 7,457,449 B2
(45) Date of Patent: Nov. 25, 2008

(54) FIGURE MOVING METHOD

(75) Inventors: Daisuke Sakurai, Tokyo (JP); Noriyuki Yamamoto, Tokyo (JP); Kotoe Nishio, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 895 days.

(21) Appl. No.: 10/890,106

(22) Filed: Jul. 14, 2004

(65) Prior Publication Data

US 2005/0068341 A1 Mar. 31, 2005

(30) Foreign Application Priority Data

Sep. 30, 2003 (JP) ............... 2003-342583

(51) Int. Cl.
G06K 9/00 (2006.01)
G06K 9/62 (2006.01)
(52) U.S. Cl. ................... 382/129; 382/128; 382/225
(58) Field of Classification Search ........... 382/128, 382/129, 294
See application file for complete search history.

(56) References Cited

U.S. PATENT DOCUMENTS 6,754,375 B1 * 6/2004 Noblett et al. ............ 382/129

FOREIGN PATENT DOCUMENTS

WO WO 02/56057 A2 1/2002

OTHER PUBLICATIONS

"Introduction to TIGR Spotfinder", spotfinder@tigr.org, pp. 1-3.
"Ima Gene™ Version 2.0-User's Manual", BioDiscovery, Inc., 1998, pp. 1-51.
"Array Visioin-Chapter 3: Array Vision Tutorial", Imaging Research Inc., Feb. 2, 1999, pp. 1-28.
Yang, Yee Hwa et al. "Analysis of cDNA microarray images", Henry Stewart Publications, Viol. 2 No. 4 pp. 341-349, Dec. 2001.
Eisen, M., "ScanAlyzi User Manual" Stanford University, Jul. 14, 1999, pp. 1-22.
European Search Report Dated Nov. 17, 2006.

* cited by examiner

Primary Examiner—Vikkram Bali
Assistant Examiner—Soo Jin Park
(74) Attorney, Agent, or Firm—Reed Smith LLP; Stanley P. Fisher, Esq.; Juan Carlos A. Marquez, Esq.

(57) ABSTRACT

A method of moving figures whereby a number of aligned figures can be efficiently moved while maintaining the alignment. The method includes a figure group generating step of generating a plurality of figure groups arranged in a matrix by grouping a plurality of figures arranged in a matrix; an overall reference figure setting step of setting an overall reference figure selected from said plurality of figures; an entire figure moving step of moving all of the figures in the same manner as said overall reference figure when said overall reference figure is selected and moved; a reference figure setting step of setting a single reference figure selected from said plurality of figures in each of said figure groups; and a figure group moving step of moving all of the figure groups except for the figure group containing said overall reference figure while maintaining the relative relationships between the rows and columns and between the figure groups, when one of said reference figures is selected and moved.

16 Claims, 13 Drawing Sheets

FIG. 4

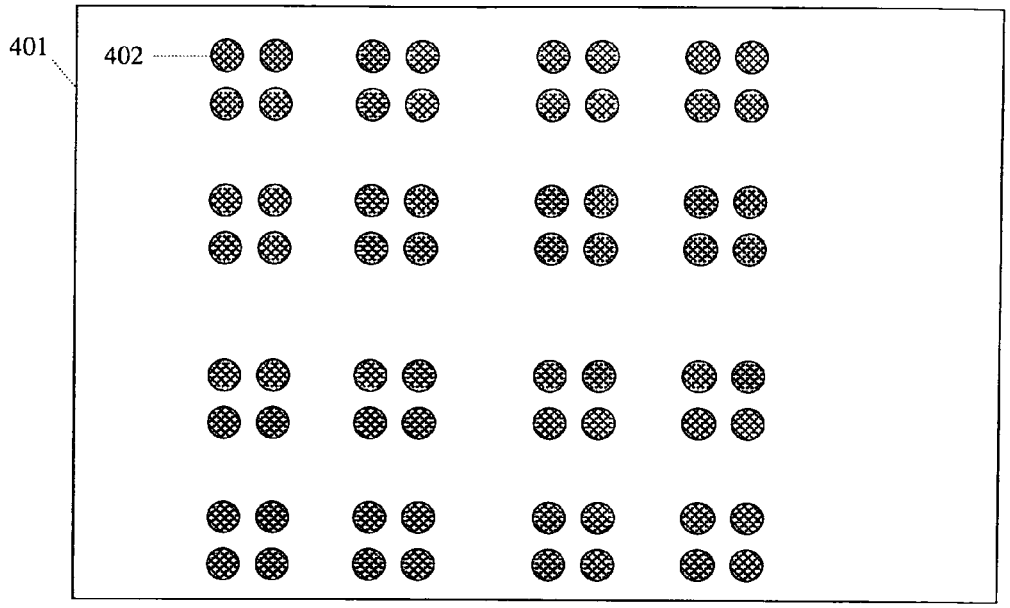

FIG. 5

| X COORDINATE OF START POSITION OF TEMPLATE | 1000 | 501 |
|---|---|---|
| Y COORDINATE OF START POSITION OF TEMPLATE | 1000 | 502 |
| NUMBER OF BLOCK GROUPS IN X DIRECTION | 2 | 503 |
| NUMBER OF BLOCK GROUPS IN Y DIRECTION | 2 | 504 |
| BLOCK GROUP INTERVAL IN X DIRECTION | 1000 | 505 |
| BLOCK GROUP INTERVAL IN Y DIRECTION | 1000 | 506 |
| NUMBER OF BLOCKS IN X DIRECTION IN GROUP | 2 | 507 |
| NUMBER OF BLOCKS IN Y DIRECTION IN GROUP | 2 | 508 |
| BLOCK INTERVAL IN X DIRECTION IN GROUP | 800 | 509 |
| BLOCK INTERVAL IN Y DIRECTION IN GROUP | 800 | 510 |
| NUMBER OF SPOTS IN X DIRECTION IN BLOCK | 2 | 511 |
| NUMBER OF SPOTS IN Y DIRECTION IN BLOCK | 2 | 512 |
| SPOT INTERVAL IN X DIRECTION IN BLOCK | 300 | 513 |
| SPOT INTERVAL IN Y DIRECTION IN BLOCK | 300 | 514 |

FIG. 6

1ST BLOCK DATA:

| | | |
|---|---|---|
| BLOCK ID | 1 | 601 |
| BLOCK NUMBER IN X DIRECTION | 1 | 602 |
| BLOCK NUMBER IN Y DIRECTION | 1 | 603 |
| X COORDINATE OF UPPER-LEFT VERTEX | 1000 | 604 |
| Y COORDINATE OF UPPER-LEFT VERTEX | 1000 | 605 |
| LENGTH OF SIDE IN X DIRECTION | 500 | 606 |
| LENGTH OF SIDE IN Y DIRECTION | 500 | 607 |
| GROUP ID OF THE CORRESPONDING BLOCK GROUP | 1 | 608 |

2ND BLOCK DATA:

| | |
|---|---|
| BLOCK ID | 2 |
| BLOCK NUMBER IN X DIRECTION | 2 |
| BLOCK NUMBER IN Y DIRECTION | 1 |
| X COORDINATE OF UPPER-LEFT VERTEX | 2000 |
| Y COORDINATE OF UPPER-LEFT VERTEX | 1000 |
| LENGTH OF SIDE IN X DIRECTION | 500 |
| LENGTH OF SIDE IN Y DIRECTION | 500 |
| GROUP ID OF THE CORRESPONDING BLOCK GROUP | 1 |

3RD BLOCK DATA:

| | |
|---|---|
| BLOCK ID | 3 |
| BLOCK NUMBER IN X DIRECTION | 1 |
| BLOCK NUMBER IN Y DIRECTION | 2 |
| X COORDINATE OF UPPER-LEFT VERTEX | 1000 |
| Y COORDINATE OF UPPER-LEFT VERTEX | 2000 |
| LENGTH OF SIDE IN X DIRECTION | 500 |
| LENGTH OF SIDE IN Y DIRECTION | 500 |
| GROUP ID OF THE CORRESPONDING BLOCK GROUP | 1 |

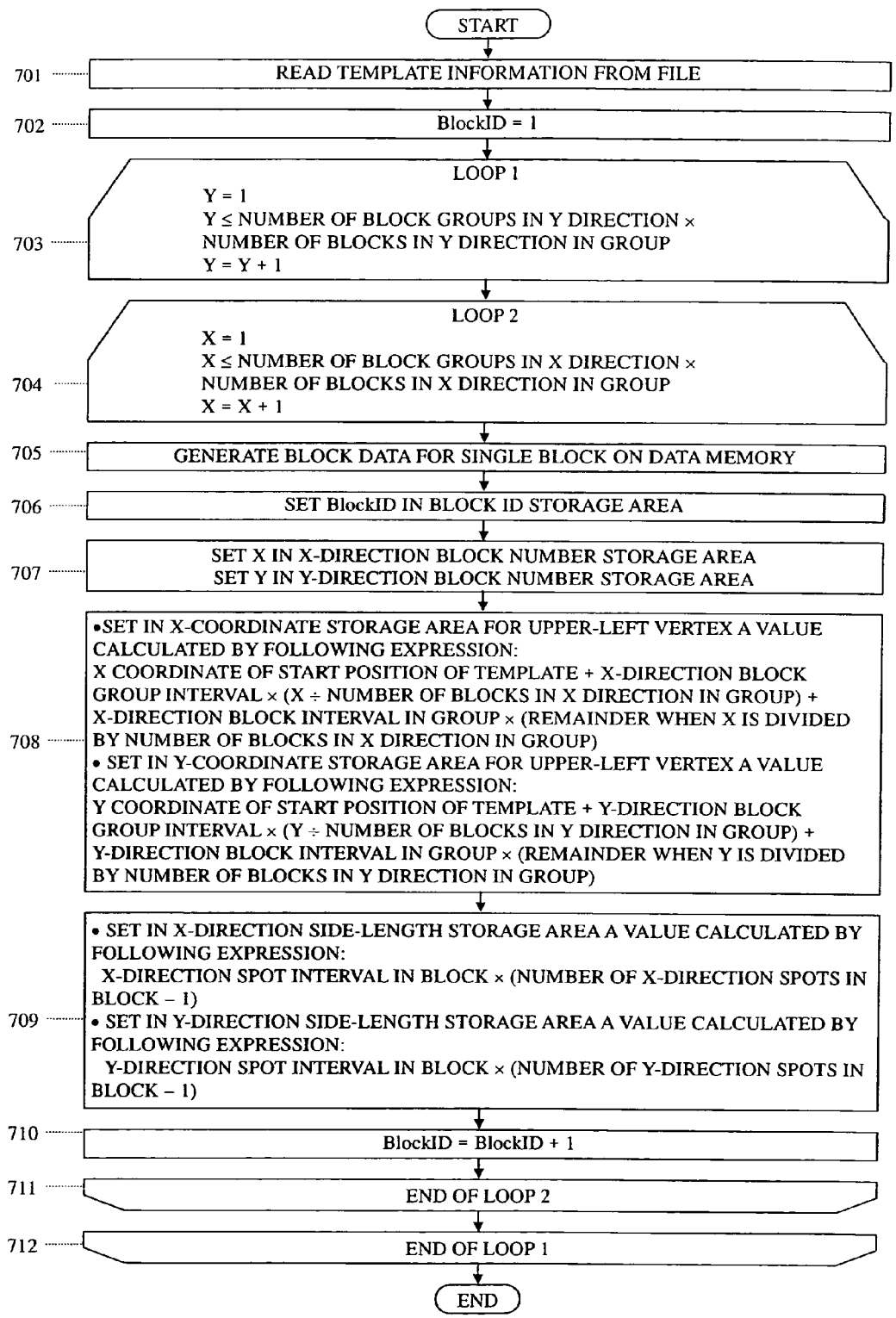

FIG. 8

| BLOCK ID OF REFERENCE BLOCK FOR ENTIRE TEMPLATE | 1 |
|---|---|

801

1ST BLOCK GROUP DATA:

| BLOCK GROUP ID | 1 | 802 |
|---|---|---|
| X-DIRECTION BLOCK GROUP NUMBER | 1 | 803 |
| Y-DIRECTION BLOCK GROUP NUMBER | 1 | 804 |
| REFERENCE BLOCK ID | 1 | 805 |

2ND BLOCK GROUP DATA:

| BLOCK GROUP ID | 1 |
|---|---|
| X-DIRECTION BLOCK GROUP NUMBER | 1 |
| Y-DIRECTION BLOCK GROUP NUMBER | 1 |
| REFERENCE BLOCK ID | 1 |

3RD BLOCK GROUP DATA:

| BLOCK GROUP ID | 1 |
|---|---|
| X-DIRECTION BLOCK GROUP NUMBER | 1 |
| Y-DIRECTION BLOCK GROUP NUMBER | 1 |
| REFERENCE BLOCK ID | 1 |

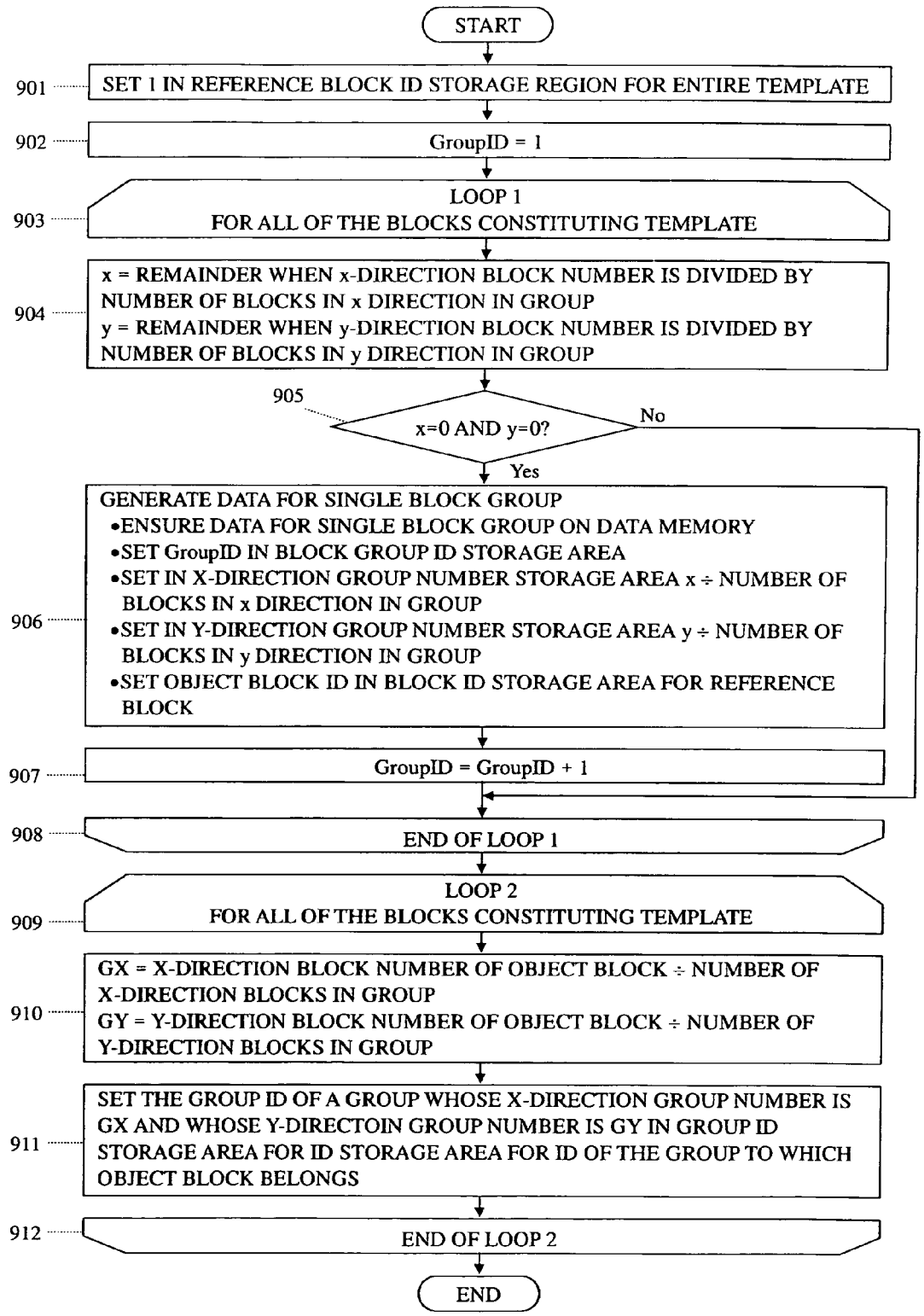

DRAG REFERENCE BLOCK 1102a IN BLOCK GROUP 1103 DOWN AND TO THE RIGHT

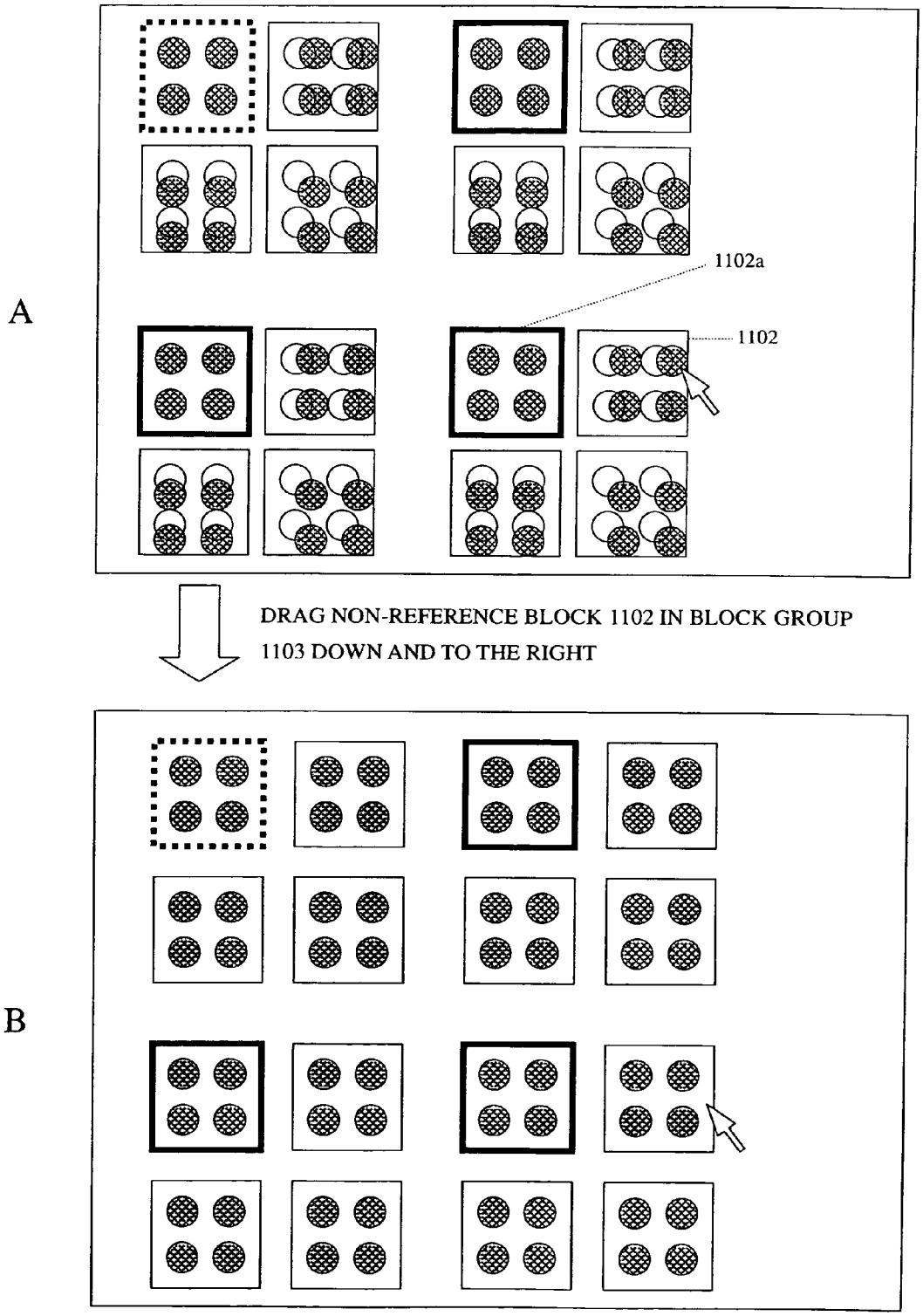

FIGURE MOVING METHOD

BACKGROUND OF THE INVENTION

1. Field of the Invention

The present invention relates to a figure moving method for moving a figure displayed on a computer display. In particular, it relates to a figure moving method suitable for DNA microarray image analysis.

2. Background Art

DNA microarrays (to be hereafter referred to as "microarrays") are used for the analysis of gene expressions in tissue or cells. In a microarray, DNA (probes) is bound to a glass or silicon substrate at high densities, and these probes are hybridized with marker samples prepared from RNA extracted from tissue or cells. The intensity of a signal from this hybridization is measured to obtain expression data concerning individual genes.

The development of microarrays has enabled the analysis of expression information concerning thousands to tens of thousands of genes at once in an exhaustive manner, thereby allowing for a simultaneous measurement of gene expression information in all of the regions of the genome.

During a microarray analysis, an image in which many circular, so-called spots are arranged vertically and horizontally is obtained. Such spots sometimes number in the tens of thousands. In the gene expression analysis using a microarray, the most troublesome work involves the position detection operation for identifying the position of the spots in a microarray image. A variety of methods have been devised for this purpose.

During the spot position detection operation, a template comprising many circular windows arranged vertically and horizontally is used. The circular windows of the template are aligned with the circular spots in the microarray image. After the windows of the template are aligned with all of the spots in the microarray image, the spot image in each window is analyzed. For example, a sum value, an average value, and a central value among the luminance values obtained from a group of pixels in each spot image are calculated as expression values.

In general, the circular windows in a template are divided into a plurality of blocks. During the aligning operation for aligning the circular windows of the template with the spots, the overall position of the template and the position of each block are adjusted either manually or automatically.

As a means of adjusting the position of blocks in the prior art, a method is known whereby numerical values are entered using a keyboard in a numerical-value input area on the picture intended for the entry of block interval.

Another method is disclosed in JP Patent Publication (Kokai) No. 8-212369 A (1996), whereby, after a given block on the picture is moved using a pointing device, such as a mouse, other blocks are moved such that all of the blocks in the picture become arranged at equal intervals with respect to one another.

(Patent Document 1)
JP Patent Publication (Kokai) No. 8-212369 A (1996)

SUMMARY OF THE INVENTION

In the method using a conventional pointing device, such as a mouse, it is possible to adjust all of the blocks on the picture such that they are arranged at equal intervals. However, numerical values must be entered using a keyboard, after all, which reduces the adjustment efficiency.

It is therefore the object of the invention to provide an efficient figure moving method for moving a number of aligned figures in an aligned condition.

The invention provides a method of moving figures, comprising:

a figure group generating step of generating a plurality of figure groups arranged in a matrix by grouping a plurality of figures arranged in a matrix;

an overall reference figure setting step of setting an overall reference figure selected from among said plurality of figures;

an entire figure moving step of moving all of the figures in the same manner as said overall reference figure when said overall reference figure is selected and moved;

a reference figure setting step of setting a single reference figure selected from said plurality of figures in each of said figure groups; and a figure group moving step of moving all of the figure groups except for the figure group containing said overall reference figure while maintaining the relative relationships between the rows and columns and between the figure groups, when one of said reference figures is selected and moved.

The method of moving figures further comprises a figure moving step of moving the figures other than said overall reference figure and said reference figures in all of the figure groups while maintaining the relative relationships between the rows and columns when a figure other than said overall reference figure and said reference figures is selected and moved.

In the method of moving figures, said figure group generating step comprises generating figure groups such that the intervals between adjacent groups are equal both horizontally and vertically, and said figure group moving step comprises moving the figure groups such that the intervals between said adjacent figure groups are equal both horizontally and vertically.

In the method of moving figures, said figure group generating step comprises grouping the figure groups such that the number of figures contained in each figure group is the same and such that the figures are arranged in the same manner in each figure group.

In the method of moving figures, when the figures in a figure group are arranged such that the intervals between adjacent figures are equal both horizontally and vertically, said figure moving step comprises moving the figures such that the intervals between said adjacent figures are equal both horizontally and vertically.

The method of moving figures further comprises a displaying step of displaying said overall reference figure and said reference figure differently from the other figures in a visually distinguishable manner.

In accordance with the invention, a plurality of figures arranged in a matrix can be efficiently moved, so that windows in a template can be efficiently aligned with spots in a microarray image.

BRIEF DESCRIPTION OF THE DRAWINGS

FIG. 4 shows an example of a microarray image displayed on the picture.

FIG. 5 shows an example of the data structure of template information according to the invention.

FIG. 6 shows an example of the data structure of block data according to the invention.

FIG. 7 shows a flowchart illustrating the processes performed in accordance with a block data generating program according to the invention.

FIG. 8 shows an example of the data structure of block group data according to the invention.

FIG. 9 shows a flowchart illustrating the processes performed by a block group constructing/reference block setting program according to the invention.

FIG. 16 is a drawing for the explanation of an example of the execution of the block/block group moving program according to the invention.

DESCRIPTION OF THE PREFERRED EMBODIMENTS

Figure 1:
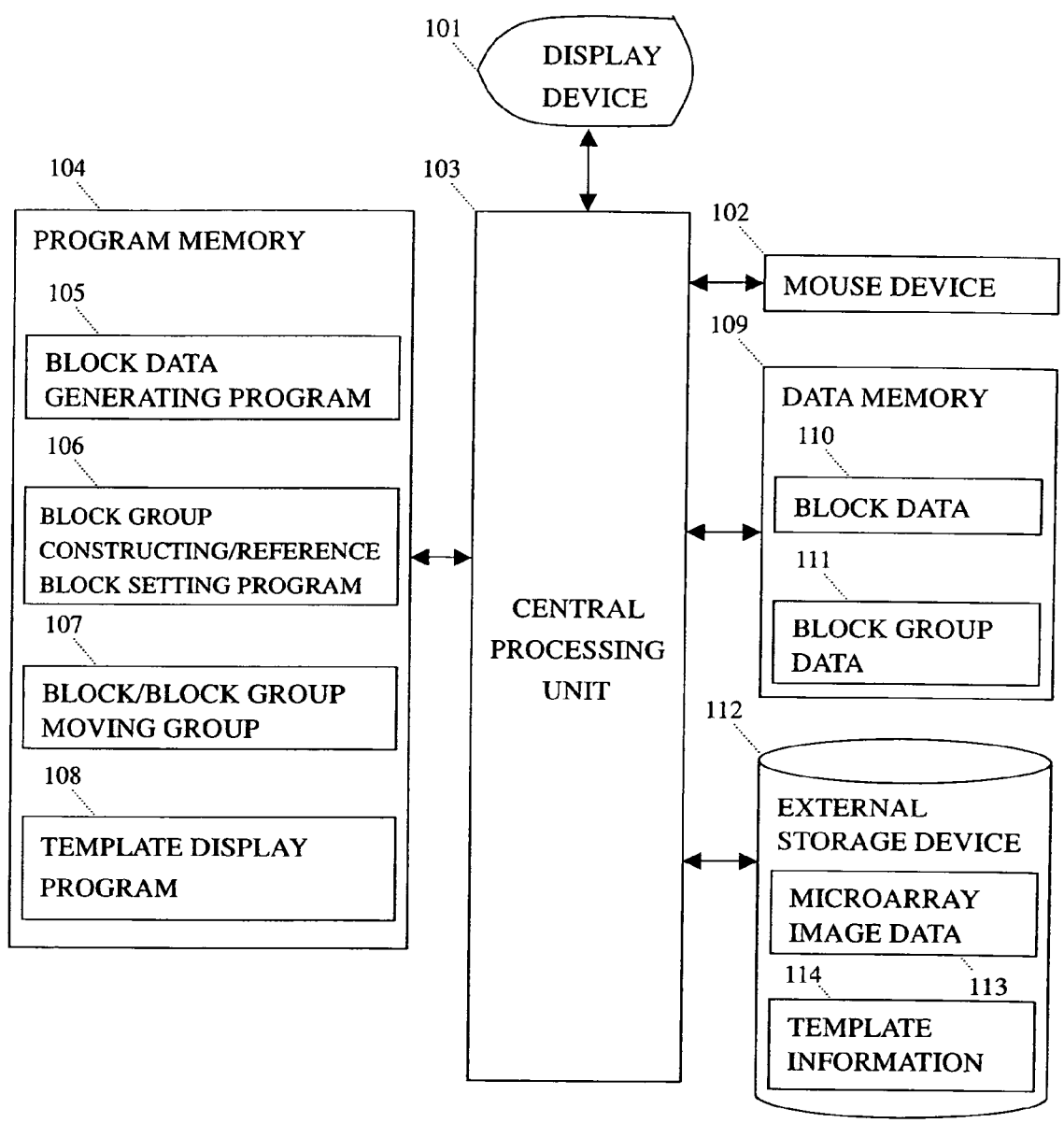
FIG. 1 shows a block diagram of an example of an apparatus for carrying out a method of moving figures according to the invention.

Embodiments of the invention will be hereafter described. FIG. 1 shows a block diagram of an apparatus for carrying out a figure moving method according to the invention. The apparatus in this embodiment comprises a display device 101 for displaying figures on a screen, a mouse device 102 for indicating a desired area on the picture, a central processing device 103 for creating templates and carrying out processes such as a block moving process, a program memory 104 in which a program for causing the central processing device 103 to perform processes is stored, a data memory 109 for temporarily storing data, and an external memory device 112, such as a hard disk.

The program memory 104 stores a block data generating program 105 for generating template block data, a block group constructing/reference block setting program 106 for constructing block groups by relating blocks in a template to one another and for setting a reference block group, a block/block group moving program 107 for moving, as a selected block is moved, other blocks at once such that block groups or blocks in a group are arranged at equal intervals, and a template display program 108 for displaying a template.

A template is created using the block data generating program 105, the block group constructing/reference block setting program 106, and the block/block group moving program 107.

In the data memory 109, there are stored block data 110 concerning individual blocks and block group data 111 concerning individual block groups, for example.

In the external memory device 112, there are stored microarray image data 113 and template information 114, for example.

Figure 2:
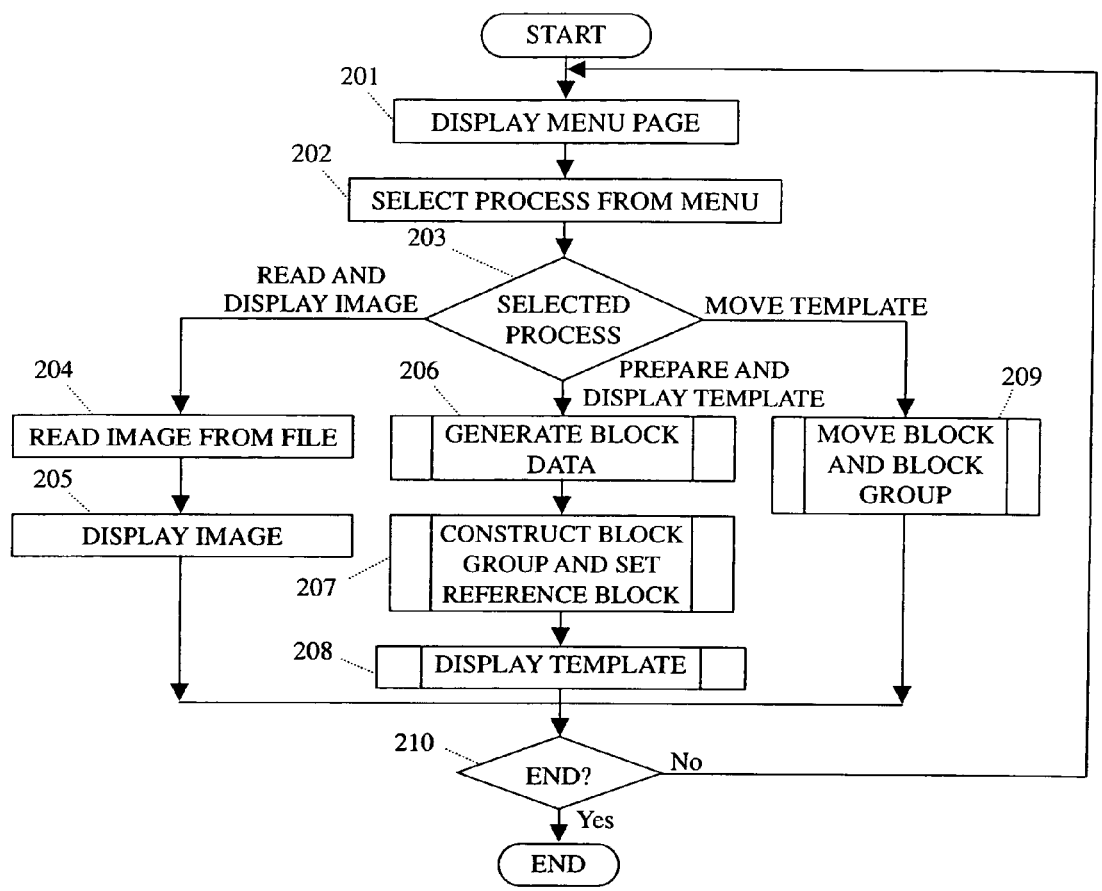
FIG. 2 shows a flowchart illustrating the outline of the processes performed in accordance with the method of moving figures of the invention.
Figure 3:
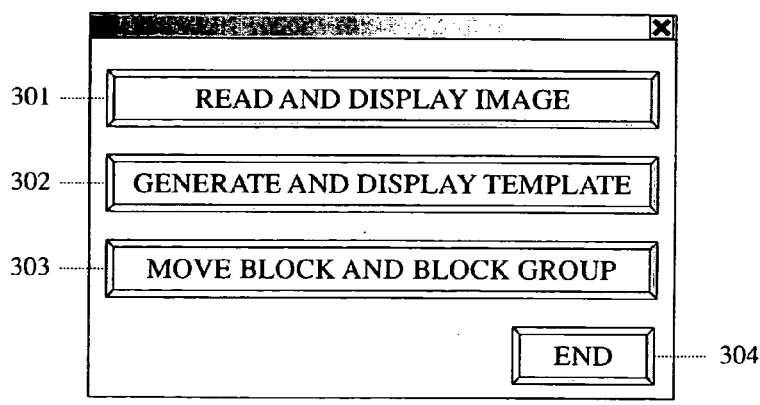
FIG. 3 shows an example of a menu page displayed on the screen of a display device according to the invention.

An embodiment of the invention will be described by referring to FIGS. 2 to 16. FIG. 2 shows a flowchart illustrating the outline of the processes performed in the present embodiment. In step 201, a menu page for the selection of a process to be performed is displayed on the display device 101. FIG. 3 shows an example of the menu page that includes a button 301 for initiating the implementation of a microarray image reading and display process, a button 302 for initiating the implementation of a template generating and displaying process, a button 303 for initiating the implementation of a template block/block group moving process, and button 304 for terminating the routine.

Then, in step 202, the user selects on the menu page of FIG. 3 a process to be performed. In step 203, the routine branches to a program in accordance with the process selected.

If in step 202 the button 301 shown in FIG. 3 is pressed, thereby initiating the reading and display of a microarray image, the routine proceeds to step 204. In step 204, the microarray image data 113 stored in the external memory device 112 is read and then displayed on the display device 101 in step 205.

FIG. 4 shows an example of the microarray image displayed on a picture 401 on the display device 101. The microarray image consists of regularly arranged spots 402.

If in step 202 the button 302 shown in FIG. 3 is pressed, thereby initiating the generation and display of a template, the routine proceeds to step 206. In step 206, the block data generating program 105 is carried out. In step 207, the block group constructing/reference block setting program 106 is carried out. In step 208, the template display program 108 is carried out.

If in step 202, the button 303 shown in FIG. 3 is pressed thus initiating the movement of a block and a block group, the routine proceeds to step 209. In step 209, the block/block group moving program 107 is implemented.

After either the reading/display of the image, the generation/display of the template, or the moving of the template is carried out, it is determined in step 210 whether or not the button 304 of FIG. 3 has been pressed, and if pressed, the routine is terminated. If not, the routine returns to step 201 where the menu page is displayed.

Figure 11:
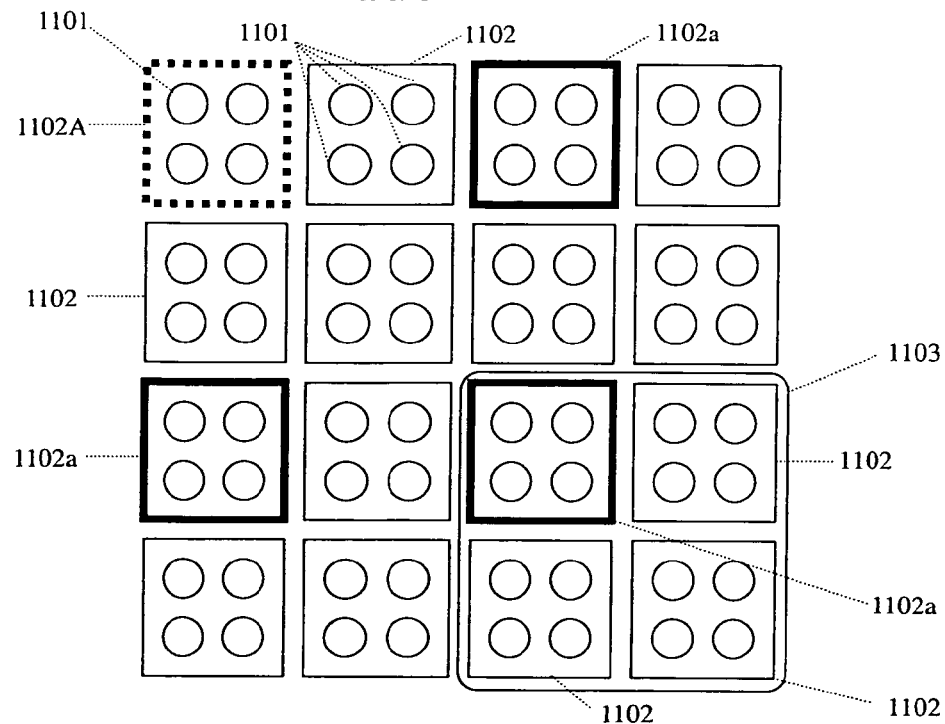
FIG. 11 shows an example of a template displayed on the picture according to the invention.

In the following, the template generating process, which is carried out in steps 206 to 208, will be described. In the block data generating program that is carried out in step 206, the template information 114 stored in the external storage device 112 is read, and block data for which a template is to be made is generated in the block group storage area 110. The template comprises a plurality of regularly arranged blocks 1102, as shown in FIG. 11. Each of the blocks 1102 comprises a plurality of regularly arranged windows 1101.

FIG. 5 shows an example of the data structure of the template information 114. The template information 114 includes an X coordinate 501 of the start position of the template, a Y coordinate 502 of the start position of the template, the number 503 of block groups in the X direction, the number 504 of block groups in the Y direction, a block group interval 505 in the X direction, a block group interval 506 in the Y direction, the number 507 of blocks in the X direction in each group, the number 508 of blocks in the Y direction in each group, a block interval 509 in The X direction in each group, a block interval 510 in the Y direction in each group, the number 511 of spots in The X direction in each block, the number 512 of spots in the Y direction in each block, a spot interval 513 in the X direction in each block, and a spot interval 514 in the Y direction in each block.

FIG. 6 shows an example of the data structure of the block data 110. There are created as many block data items as the number of the blocks in the template. Each item of block data includes a block ID 601 uniquely allocated in the template, an X direction block number 602, a Y-direction block number 603, an X coordinate 604 of the upper-left vertex of the block, a Y coordinate 605 of the upper-left vertex of the block, length 606 of a side of the block in the X direction, length 607 of a side of the block in the Y direction, and a group ID 608 of the block group to which the block belongs.

FIG. 7 shows a flowchart of the block data generating program 105. In step 701, the individual items of data 501 to 514 of the template information 114 are acquired. In step 702, the value of a variable BlockID indicating the block ID is initialized to 1.

In step 703, the initial value of a variable Y is set to 1. It is determined whether or not the variable Y is not more than (number of block groups in the Y direction×Y blocks in the group). If variable Y is not more than (number of block groups in the Y direction×Y blocks in the group), variable Y is increased by one, and the following steps 704 to 711 are conducted and then repeated.

In step 704, the initial value for variable X is set to 1. It is then determined whether or not variable X is not more than (number of block groups in the X direction×number of X blocks in the group). If variable X is not more than (number of block groups in The X direction×number of X blocks in the group), variable X is incremented by 1 and the following steps 705 to 710 are performed in a repeated manner.

In step 705, a block data storage area for a single block is created on the data memory 109. In step 706, the variable BlockID value is set for the block ID 601 in the block data storage area created. In step 707, the value of variable X is set for the X-direction block number 602 in the block data storage area, and the value of variable Y is set for the Y-direction block number 603 in the block data storage area.

In step 708, the value calculated by the following expression 1 is set for the X coordinate of the upper-left vertex of the block data storage area. The value calculated by the following expression 2 is set for the Y coordinate of the upper-left vertex of the block data storage area.

$X$ coordinate of the start position of the template + $X$-direction block group inerval × ($X$ ÷ number of intra-group $X$-direction blocks) + intra-group $X$-direction block interval × (remainder when $X$ is divided by the number of blocks in The $X$ direction in the group) (Expression 1)

$Y$ coordinate of the start position of the template + $Y$-direction block group interval × ($Y$ ÷ number of $Y$-direction blocks in the group) + intra-group $Y$-direction block interval × (remainder when $Y$ is divided by the number of blocks in the $Y$ direction in the group) (Expression 2)

In step 709, the values calculated by the following expressions are set for the lengths of the sides in the X and Y directions of the block data storage area.

Intra-block $X$-direction spot interval × (number of spots in the $X$ direction of the block−1) (Expression 3)

Intra-block $Y$-direction spot interval × (number of spots in the $Y$ direction of the block−1) (Expression 4)

In step 710, the variable BlockID is counted up by one. When the block data generating process is carried out for all of the blocks that constitute the template, the routine comes to an end.

Thereafter, the block group constructing/reference block setting program is carried out in step 207 shown in FIG. 2. Using the block group constructing/reference block setting program, block group data is generated from the template information read by the block data generating program and the block data created and is stored in the block group data storage area 112.

FIG. 8 shows an example of the data structure of the block group data 111. The block group data 111 includes a block ID 801 of the reference block of the entire template, a block group ID 802 uniquely identifying the block group, an X-direction block group number 803, a Y-direction block group number 804, and a block ID 805 of a reference block in the group. As many items of the block group data 802 to 805 are created as there are block group data items in the template.

FIG. 9 shows a flowchart of the block group constructing/reference block setting program. Referring to this figure, the block group constructing/reference block setting program 106 will be described.

In step 901, 1 is set for the reference block ID 801 of the entire template, 1 being the block ID of the block located at the uppermost left corner of the template. While in the present embodiment the block located at the uppermost-left corner is used as the reference block for the entire template, any block in the template may be used as the reference block for the entire template.

In step 902, the value of variable GroupID indicating the group ID is initialized to 1. For all of the blocks constituting the template (step 903), the processes in steps 904 to 907 are performed.

In step 904, the remainder when the x-direction block number of the object to be processed ("process object block") is divided by the number of blocks in the x-direction in the group is substituted into variable x. The remainder when the y-direction block number of the process object block is divided by the number of blocks in the y direction in the group is substituted into variable y.

In step 905, it is determined whether the value of variable x and the value of variable y obtained in step 904 are both zero; namely, whether the process object block is located at the upper left corner within the block group. If at least one of variables x and y is not zero, the procedure for this block is over and the next block is processed. If both variables x and y are zero, the routine proceeds to step 906.

In step 906, data for a single block group is generated. Specifically, a data storage area for a single block group is created on the data memory 109, variable GroupID is set for the block group ID 802 in the thus-created block group data area, the quotient when variable x is divided by the number of blocks in the X direction in the group is set for the X-direction group number 803, the quotient when variable y is divided by the number of blocks in the Y direction in the group is set for the Y-direction group number 804, and the block ID of the process object block is set for the reference block ID 805. In step 907, variable GroupID is counted up by one.

After the block group data is created and the reference block is set for the above-described manner, the block groups and the blocks are associated with one another. For all of the blocks constituting the template (step 909), the processes in steps 910 to 111 are performed.

In step 910, the quotient when the X-direction block number of the process object block is divided by the number of blocks in the X direction in the group is set for variable GX.

For variable GY, the quotient when the Y direction block number of the process object block is divided by the number of blocks in the Y direction in the group is set. The values thus set for variables GX and GY are no less than the group numbers in the X- and Y-directions of the block group to which the process object block belongs.

In step 911, the block group data is searched for block group data of which the X-direction block group number is equal to variable GX and the Y-direction block group number is equal to variable GY. The block group ID of the retrieved block group data is set for the group ID 608 of the corresponding block group in the process object block data storage area.

Thus, in the template generating and displaying process, the block group data is generated, the block groups and blocks are associated, and the reference block is set.

Thereafter, the process in step 208 of FIG. 2, namely, the template display program for displaying the generated template on the display device 101, is carried out.

Figure 10:
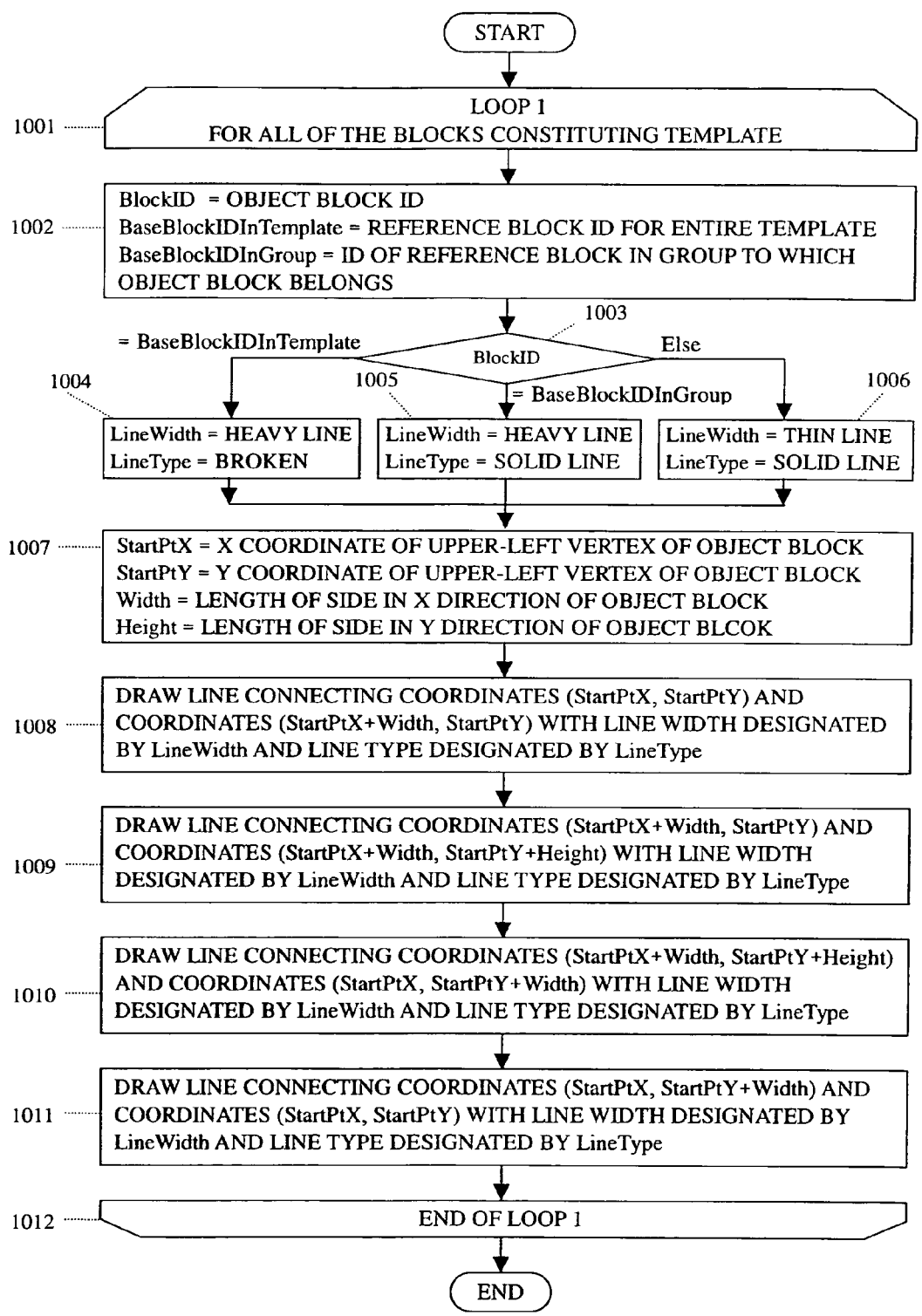
FIG. 10 shows a flowchart of the processes performed by a template-displaying program according to the invention.

The template display program 108 will be described by referring to FIG. 10 showing a flowchart of the program. For all of the blocks constituting the template, the following process is carried out.

For all of the blocks (step 1001), steps 1002 to 1011 are performed, as described below.

In step 1002, the block ID of the process object block is substituted into variable BlockID. The reference block ID of the entire template is substituted into variable BaseBlockID-InTemplate. The ID of the reference block in the block group to which the process object block belongs is substituted into variable BaseBlockIDInGroup.

In step 1003, it is determined whether variable BlockID is equal to variable BaseBlockIDInTemplate or variable BaseBlockIDInGroup, or different from both of them.

If it is determined that variable BlockID is equal to variable BaseBlockIDInTemplate, the routine proceeds to step 1004. If variable BlockID is determined to be equal to variable BaseBlockIDInGroup, the routine proceeds to step 1005. If it is determined to be different from both of them, the routine proceeds to step 1006.

In step 1004, some kind of identifier indicating a heavy line is substituted into variable LineWidth, which indicates the width of the lines with which the process object block is drawn. Into variable LineType indicating the type of lines that are drawn, some kind of identifier indicating a broken line is substituted.

In step 1005, some kind of identifier indicating a heavy line is substituted into variable LineWidth, which indicates the width of the lines with which the process object block is drawn. Some kind of identifier indicating a solid line is substituted into variable LineType, which indicates the type of lines drawn.

In step 1006, some kind of identifier indicating a thin line is substituted into variable LineWidth, which indicates the width of the lines with which the process object block is drawn. Some kind of identifier identifying a solid line is substituted into variable LineType, which indicates the kind of lines drawn.

In step 1007, the X coordinate of the upper-left vertex of the process object block is substituted into variable StartPtX. The Y coordinate of the upper-left vertex of the process object block is substituted into variable StartPtY. The length of the side in the X-direction of the process object block is substituted into variable Width. The length of the side in the Y-direction of the process object block is substituted into variable Height.

In step 1008, the line connecting the coordinates (StartPtX, StartPtY) and the coordinates (StartPtX+Width, StartPtY) is drawn with the line width designated by LineWidth and the type of line designated by LineType.

In step 1009, the line connecting the coordinates (StartPtX+Width, StartPtY) and the coordinates (StartPtX+Width, StartPtY+Height) is drawn with the line width designated by LineWidth and with the type of line designated by LineType.

In step 1010, the line connecting the coordinates (StartPtX+Width, StartPtY+Height) and the coordinates (StartPtX, StartPtY+Width) is drawn with the line width designated by LineWidth and with the type of line designated by LineType.

In step 1011, the line connecting the coordinates (StartPtX, StartPtY+Width) and the coordinates (StartPtX, StartPtY) is drawn with the line width designated by LineWidth and with the type of line designated by LineType. This concludes the processes for generating and displaying the template.

FIG. 11 shows an example of the template displayed on the display device 101, the template having been obtained through the processes of generating the block data, generating the block group data, associating the blocks and block groups, and setting the reference block, in accordance with the template information 114 shown in FIG. 5. As shown in FIG. 11, the template comprises a plurality of regularly arranged blocks 1102. Each of the blocks 1102 comprises a plurality of regularly arranged windows 1101. In the illustrated example, each block includes four windows. The number of the windows, however, may be greater than four.

In the present example, the four blocks 1102*a*, 1102, 1102, and 1102 together form a single block group 1103.

From these blocks, a reference block 1102A is selected for the entire template, and a single reference block 1102*a* is selected for each block group.

In FIG. 11, the round-cornered square drawn with a solid line delineating the block group 1103 is shown for the sake of convenience and is not in reality drawn.

Figure 12:
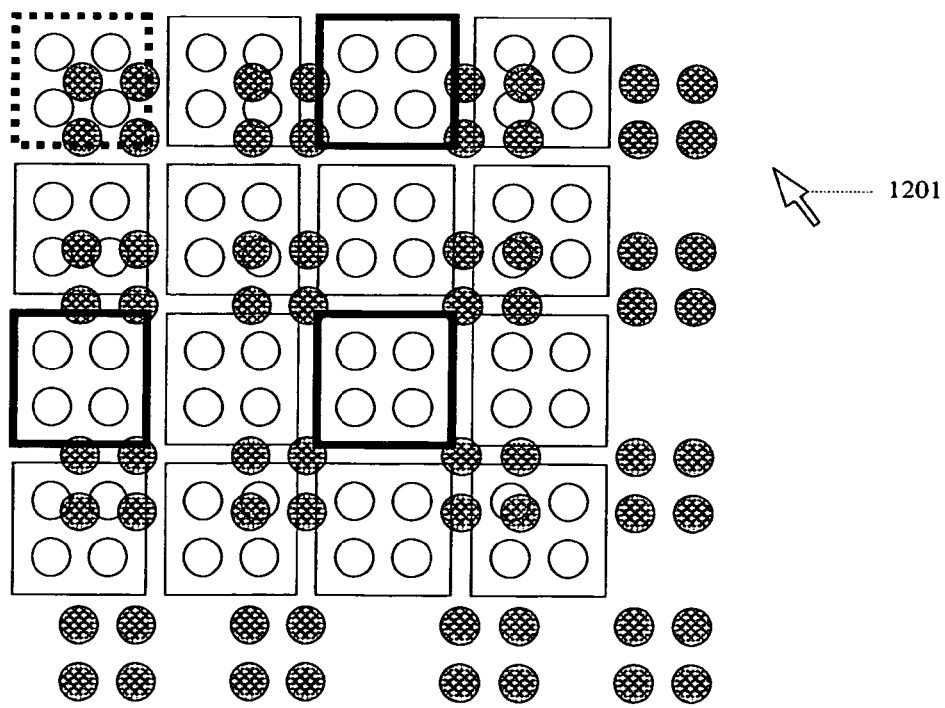
FIG. 12 shows the template of the invention being tentatively superposed on a microarray image.

FIG. 12 shows the microarray image shown in FIG. 4 and the template shown in FIG. 11 tentatively superposed upon one another on the screen of the display device 101. None of the windows in the template are aligned with any of the spots in the microarray image. On the picture, a mouse cursor 1201 is indicated with which the blocks constituting the template can be designated.

In order to align each window of the template with each spot in the microarray image, the user selects the block moving process, whereby the block/block group moving program 107 is run. After each of the windows of the template has been aligned with each of the spots 402 of the microarray image, the sum value, average value, and central value of the luminance of the group of pixels disposed in each of the windows areas are calculated as expression values.

Figure 13:
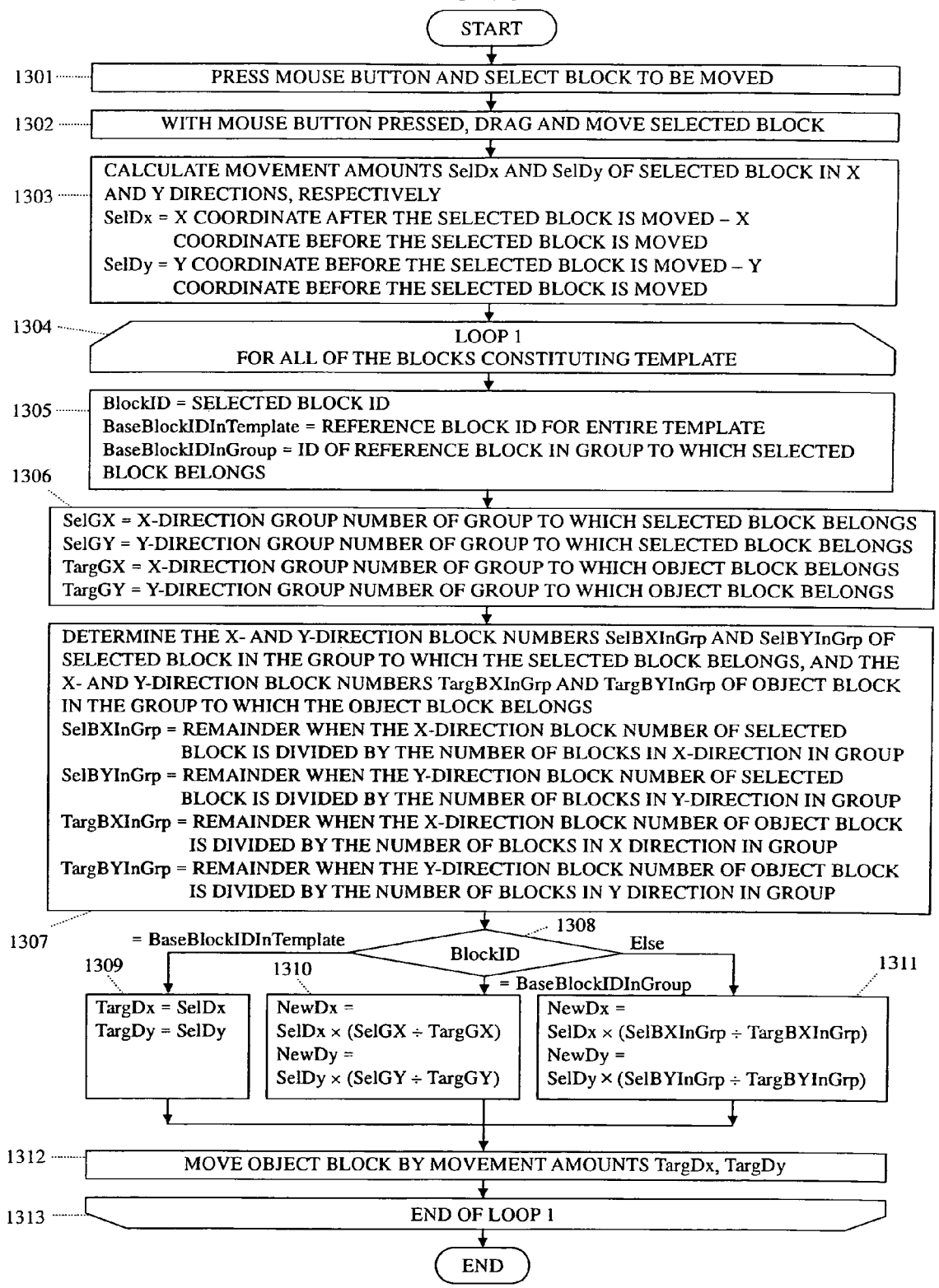
FIG. 13 is a drawing for the explanation of an example of the execution of a block/block group moving program according to the invention.

Now referring to FIG. 13, the process in step 209 of FIG. 2, namely the block/block group moving program 107, will be described. In step 1301, the user presses the mouse button and selects a block to be moved. In step 1302, the user drags the thus-selected block to a target position.

In step 1303, the amount of movement of the selected block in the X and Y directions is calculated and substituted into variables SelDx and SelDy, respectively.

Then, for all of the blocks constituting the template (step 1304), the processes in steps 1305 to 1312 are performed.

First, in step 1305, the block ID of the process object block is substituted into variable BlockID. The reference block ID for the entire template is substituted into variable BaseBlock-IDInTemplate. The ID of the reference block in the block group to which the process object block belongs is substituted into variable BaseBlockIDInGroup.

In step 1306, the X-direction group number of the group to which the selected block belongs is substituted into variable SelGX. The Y-direction group number of the group to which the selected block belongs is substituted into variable SelGY. The X-direction group number of the group to which the process object block belongs is substituted into variable TargGX. The Y-direction group number of the group to which the process object block belongs is substituted into variable TargGY.

In step 1307, the block numbers SelBXInGrp and SelBYInGrp in the X and Y directions of the selected block in the group to which the selected block belongs, and the block numbers TargBXInGrp and TargBYInGrp in the X and Y directions of the object block in the group to which the object block belongs are calculated by the following equations:

SelBXInGrp=the remainder when the X-direction block number of the selected block is divided by the number of blocks in the X direction in the group SelBYInGrp=the remainder when the Y-direction block number of the selected block is divided by the number of blocks in the Y direction in the group TargBXInGrp=the remainder when the X-direction block number of the object block is divided by the number of blocks in the X direction in the group TargBYInGrp=the remainder when the Y-direction block number of the object block is divided by the number of blocks in the Y direction in the group In step 1308, it is determined whether variable BlockID is equal to variable BaseBlockIDInTemplate or variable BaseBlockIDInGroup, or different from both of them. If variable BlockID is determined to be equal to variable BaseBlockIDInTemplate, the routine proceeds to step 1309. If it is determined that variable BlockID is equal to variable BaseBlockIDInGroup, the routine proceeds to step 1310. If it is determined that variable BlockID is different from both BaseBlockIDInTemplate and BaseBlockIDInGroup, the routine proceeds to step 1311. In steps 1309 to 1311, the amount of movement of the process object block is determined based on the amount of movement of the selected block.

In step 1309, the amount of movement SelDx of the selected block in the X direction is substituted into variable TargDx, which indicates the amount of movement of the process object block in the X direction. The amount of movement SelDy of the selected block in the Y direction is substituted into variable TargDy, which indicates the amount of movement of the process object block in the Y direction. In step 1310, the product of the quotient when SelGX is divided by TargGX and variable SelDx is substituted into variable TargDx. For variable TargDy, the product of the quotient when SelGY is divided by TargGY and variable SelDy is substituted.

In step 1311, the product of the quotient when SelBXInGrp is divided by TargBXInGrp and variable SelDx is substituted into variable TargDx. The product of the quotient when SelBYInGrp is divided by TargBYInGrp and variable SelDy is substituted into variable TargDy. Finally, in step 1312, the process object block is moved by the movement amounts TargDx and TargDy. Thus, in the present embodiment, all the other blocks as well as the selected block are moved at once while maintaining the intervals among the block groups or the equal intervals among the blocks in the block group.

Figure 14:
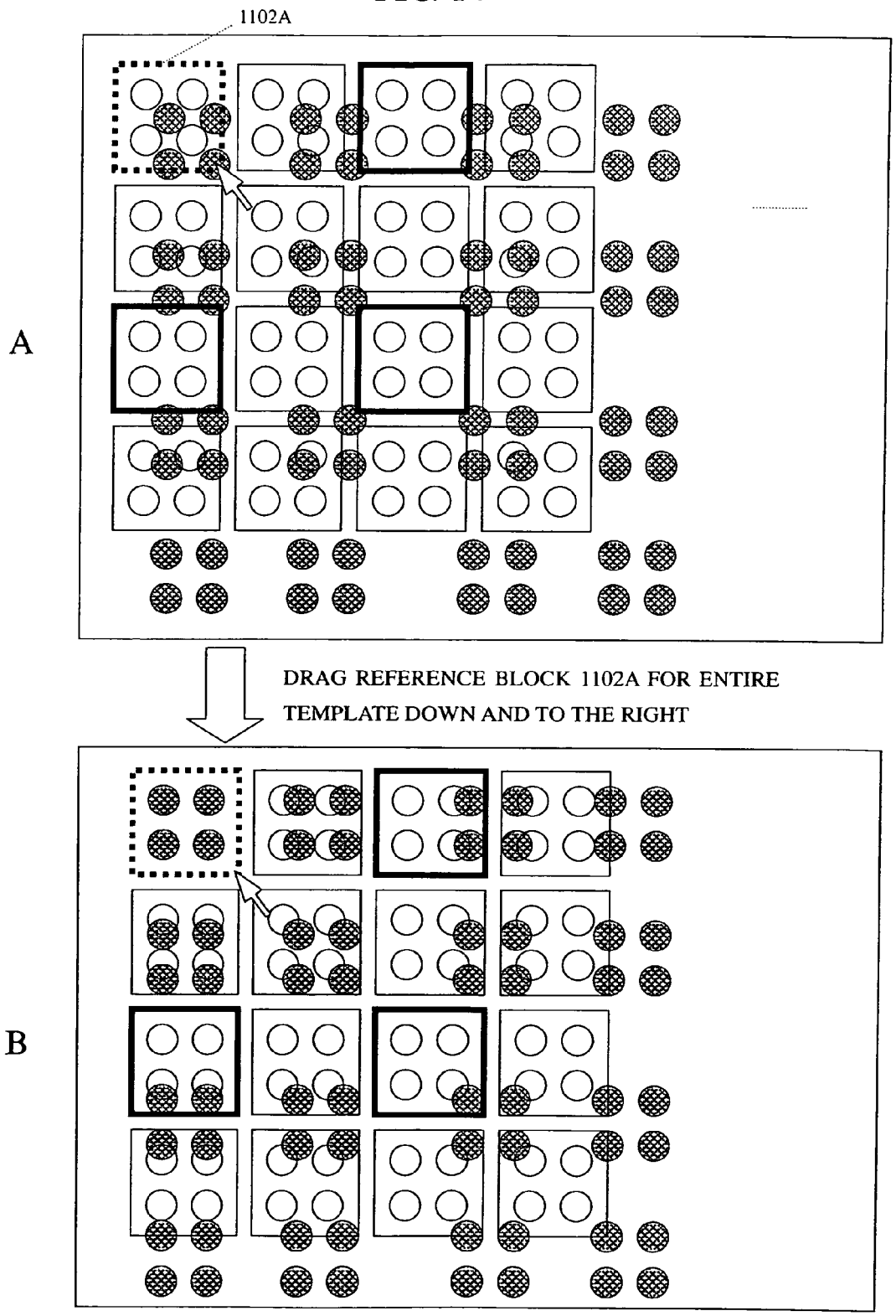
FIG. 14 is a drawing for the explanation of an example of the execution of the block/block group moving program according to the invention.

Now referring to FIGS. 14 to 16, an example of how a template is properly superposed on a spot area on a microarray using the block/block group moving program will be described. FIG. 14A, which is similar to FIG. 12, shows a picture displaying a template that is tentatively superposed on a microarray image. A reference block 1102*a* of the entire template in FIG. 14A is dragged down and to the right, thereby moving the entire template, as shown in FIG. 14B. Specifically, the entire template is moved such that the four windows in the reference block 1102A are appropriately superposed on the four spots at the upper-left corner of the microarray image.

While in this state the windows in the reference block 1102 are superposed on the spots in the microarray image, the windows in other blocks within the template are not properly superposed on the spots because the intervals among the block groups and the intervals among the blocks within the block groups are not adjusted.

Figure 15:
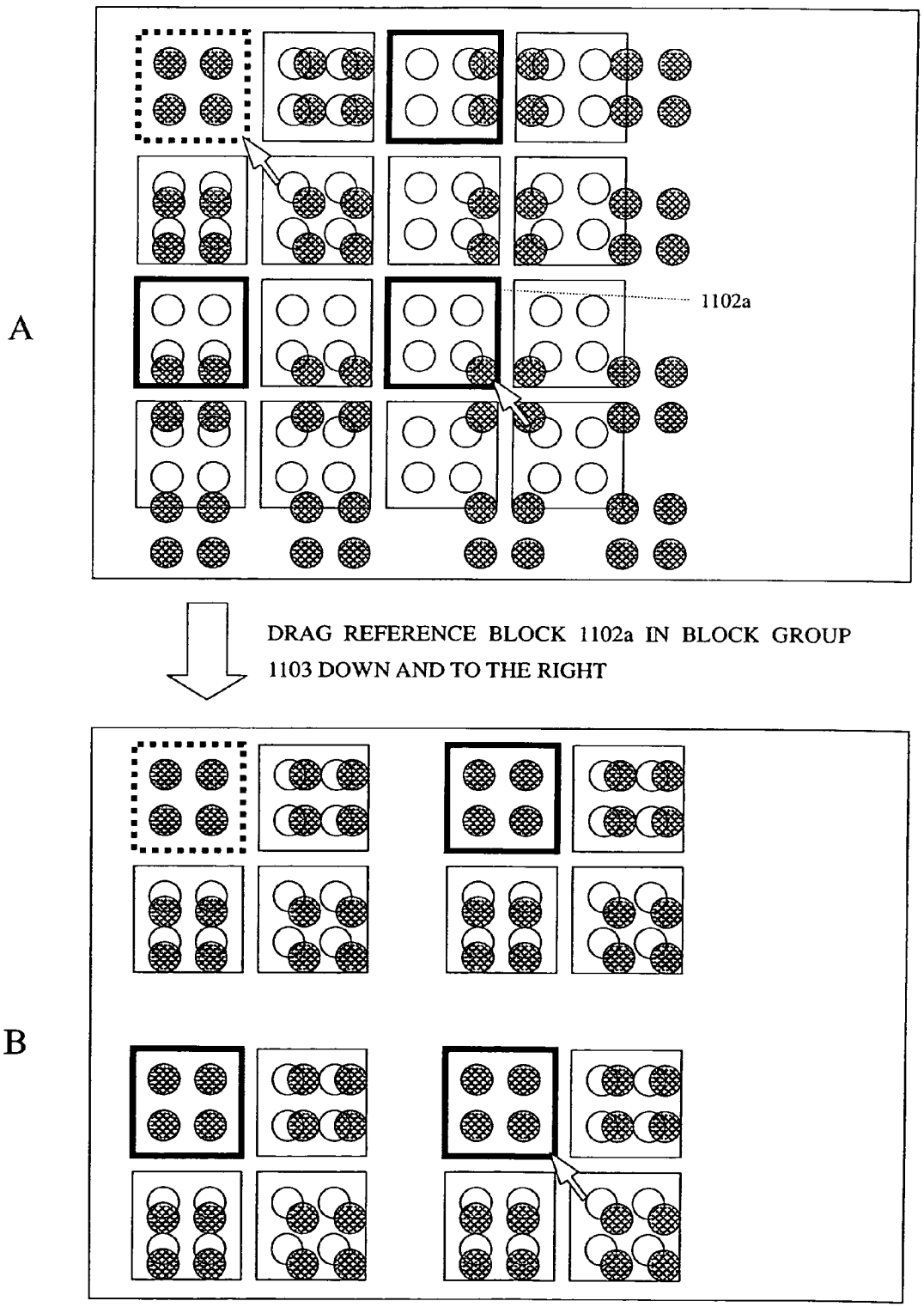
FIG. 15 is a drawing for the explanation of an example of the execution of the block/block group moving program according to the invention.

FIG. 15A is similar to FIG. 14B. The reference block 1102*a* in a lower-right block group 1103 in FIG. 15 is dragged down and to the right as shown in FIG. 15B, such that the windows in the reference block 1102*a* are properly superposed on the corresponding spots in the microarray image. As a result, the reference block in each block group is moved in the same manner as the reference block 1102*a*. Namely, all of the reference blocks are moved while maintaining the relative relationships between the rows and columns. Thus, the windows in the reference block 1102*a* are properly superposed on the corresponding spots on the microarray image. While in this state the windows in the reference block in each block group are appropriately superposed on the spots in the microarray image, the windows in other blocks of the template are not appropriately superposed on the spots because the intervals among the blocks in the block groups have not yet been adjusted.

FIG. 16A is similar to FIG. 15B. An arbitrary non-reference block 1102 is selected from an arbitrary block group in FIG. 15A. The non-reference block 1102 is then dragged down and to the right such that the windows in the non-reference block 1102 are appropriately superposed on the corresponding spots in the microarray image, as shown in FIG. 16B. As a result, the non-reference block in each block group is moved in the same manner as the selected non-reference block 1102. Namely, all of the blocks are moved while maintaining the relative relationships between the rows and columns. Thus, the windows in the non-reference blocks are appropriately superposed on the spots in the microarray image.

Consequently, all of the blocks in the template are appropriately superposed on the spot areas on the image. Namely, all of the windows in the template are appropriately superposed on the spots in the microarray image.

While preferred examples of the invention have been described using specific terms, such description is for illustrative purposes only, and it is to be understood that changes and variations may be made without departing from the scope of the following claims.

What is claimed is:

1. A method of moving figures, comprising:
   a figure group generating step of generating a plurality of figure groups arranged in a matrix by grouping a plurality of figures arranged in a matrix, each figure containing a plurality of spots;
   an overall reference figure setting step of setting an overall reference figure selected from said plurality of figures;

an entire figure moving step of moving all of the figures in the same manner as said overall reference figure when said overall reference figure is selected and moved;

a reference figure setting step of setting a single reference figure for each of said figure groups except for the figure group containing said overall reference figure; and a figure group moving step of moving all of the figure groups except for the figure group containing said overall reference figure while maintaining the relative relationships between the rows and columns and between the figure groups, when one of said reference figures is selected and moved.

2. The method of moving figures according to claim 1, wherein said figure group generating step comprises generating figure groups such that the intervals between adjacent groups are equal both horizontally and vertically, and said figure group moving step comprises moving the figure groups such that the intervals between said adjacent figure groups are equal both horizontally and vertically.

3. The method of moving figures according to claim 1, wherein said figure group generating step comprises grouping the figure groups such that the number of figures contained in each figure group is the same and the figures are arranged in the same manner in each figure group.

4. The method of moving figures according to claim 1, further comprising a displaying step of displaying said overall reference figure and said reference figure differently from the other figures.

5. The method of moving figures according to claim 1, further comprising a figure moving step of moving the figures other than said overall reference figure and said reference figures in all of the figure groups while maintaining the relative relationships between the rows and columns when a figure other than said overall reference figure and said reference figures is selected and moved.

6. The method of moving figures according to claim 1, wherein, when the figures in a figure group are arranged such that the intervals between adjacent figures are equal both horizontally and vertically, said figure moving step comprises moving the figures such that the intervals between said adjacent figures are equal both horizontally and vertically.

7. The method of moving figures according to claim 1, wherein the spots are in a DNA microarray image.

8. A method of moving figures comprising:
a figure group generating step of generating a plurality of figure groups arranged in a matrix by grouping a plurality of figures arranged in a matrix, each figure containing a plurality of spots;

an overall reference figure setting step of setting an overall reference figure selected from said plurality of figures;

an entire figure moving step of moving all of the figures in the same manner as said overall reference figure when said overall reference figure is selected and moved;

a reference figure setting step of setting a single reference figure for each of said figure groups except for the figure group containing said overall reference figure;

a figure group moving step of moving all of the figure groups except for the figure group containing said overall reference figure while maintaining the relative relationships between the rows and columns and between the figure groups, when one of said reference figures is selected and moved; and a figure moving step of moving the figures other than said overall reference figure and said reference figures in all of the figure groups while maintaining the relative relationships between the rows and columns when a figure other than said overall reference figure and said reference figures is selected and moved.

9. The method of moving figures according to claim 8, wherein, when the figures in a figure group are arranged such that the intervals between adjacent figures are equal both horizontally and vertically, said figure moving step comprises moving the figures such that the intervals between said adjacent figures are equal both horizontally and vertically.

10. A computer-readable storage medium stored with a program for causing a computer to move figures comprising:
a figure group generating module for generating a plurality of figure groups arranged in a matrix by grouping a plurality of figures arranged in a matrix, each figure containing a plurality of spots;

an overall reference figure setting module for setting an overall reference figure selected from said plurality of figures;

an entire figure moving module for moving all of the figures in the same manner as said overall reference figure when said overall reference figure is selected and moved;

a reference figure setting module for setting a single reference figure for each of said figure groups except for the figure group containing said overall reference figure; and a figure group moving module for moving all of the figure groups except for the figure group containing said overall reference figure while maintaining the relative relationships between the rows and columns and between the figure groups, when one of said reference figures is selected and moved.

11. The computer-readable storage medium stored with the program according to claim 10, further comprising a figure moving step of moving the figures other than said overall reference figure and said reference figures in all of the figure groups while maintaining the relative relationships between the rows and columns when a figure other than said overall reference figure and said reference figures is selected and moved.

12. The computer-readable storage medium stored with the program according to claim 11, wherein, when the figures in a figure group are arranged such that the intervals between adjacent figures are equal both horizontally and vertically, said figure moving step comprises moving the figures such that the intervals between said adjacent figures are equal both horizontally and vertically.

13. The computer-readable storage medium stored with the program according to claim 10, wherein said figure group generating step comprises generating figure groups such that the intervals between adjacent groups are equal both horizontally and vertically, and said figure group moving step comprises moving the figure groups such that the intervals between said adjacent figure groups are equal both horizontally and vertically.

14. The computer-readable storage medium stored with the program according to claim 10, wherein said figure group generating step comprises grouping the figure groups such that the number of figures contained in each figure group is the same and the figures are arranged in the same manner in each figure group.

15. The computer-readable storage medium stored with the program according to claim 10, further comprising a displaying step of displaying said overall reference figure and said reference figure differently from the other figures.

16. The computer-readable storage medium stored with the program according to claim 10, wherein the spots are in a DNA microarray image.

* * * * *